United States Patent Office 3,658,766
Patented Apr. 25, 1972

3,658,766
ANTISTATIC POLYAMIDE COMPOSITION
Tatsuya Kato and Chikatsu Okagawa, Nagoya, Ataru Suwada, Hirakata, and Stoyoshi Ohno, Kyoto, Japan, assignors to Toray Industries, Inc., Tokyo, and Sanyo Chemical Industries, Ltd., Kyoto, Japan
No Drawing. Filed June 1, 1970, Ser. No. 42,497
Int. Cl. C08g 20/38
U.S. Cl. 260—78 S
8 Claims

ABSTRACT OF THE DISCLOSURE

A composition excellent in antistatic properties and shapability, capable of being shaped into a fiber and the like, which comprises a compound obtained by phosphoric esterification of an addition product of a compound containing a carbonamide group selected from the class consisting of a monomer containing in its molecule a carbonamide group and a polyamide oligomer, and a synthetic linear polyamide.

DETAILED DESCRIPTION OF THE INVENTION

The present invention relates to an improved, novel polyamide composition. More particularly, the invention relates to a novel synthetic polyamide composition having improved antistatic properties.

It is known that in general a polyamide has certain desirable chracteristics, such as excellent tenacity, abrasion resistance and good dyeability, and that polyamides are broadly used as fibers, shaped articles, films and the like and are of great value industrially. However, due to the hydrophobic property of these polymers, when they are used in an atmosphere of low humidity objectionable results are experienced. For example, a remarkable discharge shock is derived from generation of static electricity upon putting on and taking off clothing made of polyamide material; or, when a polyamide is used as a carpet, sparks are generated and clothing clings to the wearer's body. Further, a polyamide tends to absorb dust and often clothing comprised of polyamide material becomes too dirty to wear or use continuously. These electrostatic problems are seen not only in structures like knitted goods and woven fabrics consisting of a polyamide, but also in mixed spun products and interwoven products of a polyamide with a natural fiber such as cotton and wool, a regenerated fiber such as rayon and other synthetic fibers such as polyester and polyacrylonitrile. On account of this, prior attempts to improve such polyamides with a view to lessening their objectionable electrostatic properties have been made and a number of techniques for improving these antistatic properties have been proposed.

As examples thereof, a method of aftertreating the surface of a shaped article such as fiber with a hygroscopic or electrically conductive substance, a method of adding an antistatic substance upon preparing a fiber or a shaped article thereto, and a method of copolymerizing a polyamide with a hygroscopic substance have been proposed. However, each method either decreases the tenacity of a fiber or a shaped article or worsens their feel. In addition, the permanence of the effect is not sufficient and, especially in the case of a fiber, these substances are easily removed by washing and the effect is lost in many cases. For example, in the method of aftertreatment wherein an antistatic agent is adhered to the surface of a fiber and the like, by washing and other treatments the antistatic agent tends to be removed and even though a temporary effect is recognized, it is never permanent. Again, for example, a method, as disclosed in British Pat. 963,320 and U.S. Pat. 3,329,557, is known wherein a compound, which has been obtained by bonding one end of polyethylene oxide through an ether bond with a hydrophobic group, is mixed with polyamide, and this mixture is spun. But this method is not being actually used because of such drawbacks as phase separation of the mixture during melt spinning or the difficulty in extruding chips of the mixture satisfactorily in a screw extruder.

The present inventors found that when a salt of a phosphoric ester of a specific addition product, which comprises a specific compound having a carbonamide bond and an alkylene oxide, were incorporated into polyamide, the aforementioned troubles did not take place in the preparation and processing of shaped articles of polyamides. Furthermore, an excellent antistatic effect was imparted to polyamides without impairing the quality of the shaped articles. It is true that by the use of such a salt of a phosphoric ester of a specific addition product, the tentative object may be achieved. However, when a fiber and the like are melt shaped from this mixture, elevation of the melt viscosity of the molten polymer is brought about. This is not a desirable phenomenon.

Therefore, as a result of various studies about a polyamide composition free from the aforesaid obstacles and advanced in antistatic properties, the present inventors have reached the present invention.

An object of the present invention is to provide a novel synthetic linear polyamide composition highly advanced in antistatic properties.

Another object of the present invention is to provide a novel synthetic linear polyamide composition advanced in permanent antistatic properties having good fastness to washing without impairing the desirable properties of a polyamide by blending with a synthetic linear polyamide a specified compound described in more detail below.

Still another object of the present invention is to provide a novel synthetic linear polyamide composition satisfying the aforesaid various objects, and which may be melt spun without problems.

Further objects of the present invention will become apparent from the following explanation. Briefly, the present invention comprises a synthetic linear polyamide composition of improved antistatic properties containing 0.5–15%, by weight, of a phosphoric triester of an addition product of (a) a compound containing a carbonamide group selected from the class consisting of a monomer containing in its molecule a carbonamide group and a polyamide oligomer and (b) an alkylene oxide preferably having 2–3 carbon atoms, wherein the said molar proportion of alkylene oxide to carbonamide in said addition product is preferably in the range 10–250.

Alkylene oxide addition polymers with organic compounds containing active hydrogen (which are well known as non-ionic surface active agents) are known to have an antistatic effect. However, when such polymers are mixed and melted with a polyamide, the resultant molten mixture is unstable in many cases and there is a tendency for coloration of the polyamide to occur or the spinnability of the polymer to worsen. Again, such a non-ionic surface active agent is very easily soluble in water. Therefore, its fastness to washing is poor in many cases. When the hydroxyl residue of these non-ionic surface active agents is phosphoric esterified, the antistatic effect is greatly improved. However, in case such surface active agents whose hydroxyl residue has been phosphoric esterified are mixed and melted with a polyamide, the spinnability of the polyamide is not good.

In contrast, in the present invention, that which is obtained by phosphoric esterifying the hydroxyl residue of a non-ionic surface active agent obtained by addition polymerization of an alkylene oxide to a monomer containing in its molecule an amide group or a polyamide oligomer is advanced in affinity with a polyamide. Therefore, the spinnability of a polyamide is hardly impaired, yet remarkably good antistatic properties are obtained. Further, when a modified polyamide obtained by blending therewith a phosphoric ester containing a large amount of a triester is melted, abnormal elevation of the melt viscosity of a modified polyamide observed generally is not seen at all and a modified polyamide fiber, whose quality is stable, is obtained.

Following is a description of a process, given by way of example rather than limitation, for producing the composition of the present invention.

The carbonamide group-containing compounds include, for example, ε-caprolactam. Dehydrated ε-caprolactam is heated and melted; an ordinary alkali catalyst (for example, a caustic alkali) is then added to it and, thereafter, while stirring the mixture, a predetermined amount of ethylene oxide is blown thereinto to effect an addition reaction. The ε-caprolactam-ethylene oxide adduct thus obtained is heated and melted and, while stirring the adduct, an equivalent of phosphorus oxychloride is added thereto to effect a phosphoric esterification reaction. The phosphoric esterification may be carried out using phosphorus pentaoxide. However, in case a high molecular weight compound is esterified, phosphorus oxychloride is especially preferably used. The reaction may be carried out in a molten state or in an inert solvent (for example, an aromatic hydrocarbon). It is preferable to neutralize the reaction product to neutralize hydrochloric acid produced as a by-product and a part of the unreacted phosphoric esterification agent with an alkali or an alkaline earth metal hydroxide.

Hereinbelow, the present invention will be explained more specifically.

The carbonamide group-containing monomer may be a 4–13-member lactam.

Useable lactams within this group include those of the formula

wherein R' is hydrogen or an alkyl radical having 1–4 carbon atoms, and $n$ is an integer of from 1 to 10. Particularly preferred are ε-caprolactam, capryllactam and laurolactam. Preferably the number of members in the lactam ring is in the range 4–13, since larger rings lower the affinity of the lactam for the polyamide matrix and smaller ring compounds tend to be decomposed and colored.

With respect to the polyamide oligomer used in the practice of the present invention, the preferred compounds include an oligomer of the aforesaid 4–13-member lactam, a low molecular weight condensation polymer of ω-aminocarboxylic acid and a low molecular weight condensation polymer of a dicarboxylic acid and a diamine.

Of the foregoing polymerized lactams, the oligomers of polymerizable lactams whose degree of polymerization is from 2 to 6 may be used in the present invention. These oligomers may be either those of cyclic or chain configuration. Those having a degree of polymerization of from 2 to 4 are particularly preferred in the present invention. The oligomers of ε-caprolactam or a mixture thereof are especially desirable from the standpoint of the utilization of by-products, since they are available as by-products in the process for the preparation of nylon 6. As in the case with the oligomers of lactams, the low molecular weight polycondensation products of ω-aminocarboxylic acid such as, for example, ω-aminoundecanoic acid, 7-aminoheptanoic acid and ω-aminocaproic acid may be used. The degree of polymerization is preferably less than 7. As the low molecular weight polycondensation products of dicarboxylic acids and diamines, those of the following structural formula may be used in the present invention,

wherein R" and R'" are each a hydrocarbon moiety of from 2 to 25 carbon atoms and $m$ is an integer of from 1 to 3. Suitable diamines include for example, hexamethylene diamine and m-xylylenediamine, while examples of suitable dicarboxylic acids include adipic, sebacic, dodecandioic and isophthalic acids.

With regard to the degree of polymerization of the polyamide oligomer used in the present invention, as mentioned above, the oligomer may be anything from a dimer to a hexamer. When the degree of polymerization is greater than 6 the activating point of the addition polymerization of an alkylene oxide increases, and when a composition using such a compound is melted, an undesirable side reaction such as gelation occurs. Therefore a degree of polymerization above 6 is avoided.

The alkylene oxide used in the practice of the present invention has 2–3 carbon atoms and when the number of carbon atoms is more than 3, its beneficial antistatic effect is remarkably reduced. As examples of the compound effectively usable in the present invention, ethylene oxide, propylene oxide and mixtures thereof may be cited. Ethylene oxide is especially remarkable in antistatic effect and is therefore most preferred.

As a method of adding an alkylene oxide to the aforesaid compound containing a carbonamide group, any method may be used. For instance, an alkylene oxide may be addition polymerized to said compound containing a carbonamide group in a customary manner in the presence of an acid or alkali catalyst at, for example, a temperature of 140° C. and under a pressure of 3 atmospheres. The foregoing method does not limit the present invention. Further, the alkylene oxide may be added in a singular, random or block form.

The number of moles of alkylene oxide added is determined in accordance with the objective desired. However, generally better antistatic properties are produced when a higher molar proportion is added. Hence, while there will be differences depending upon the class of the alkylene oxide, generally speaking, the use of 10 to 250 molar equivalents, especially 20 to 100 molar equivalents of the alkylene oxide based on the carbonamide group of the aforesaid compound containing a carbonamide group is preferred.

If less than 10 moles of alkylene oxide are added (per carbonamide group) the antistatic properties of the product is not good and the yarn making properties of the product when melt spun and drawn are also not good. When the number of molar equivalents of alkylene oxide added exceeds 10, little difference is observed in the characteristics of fibers obtained from the product. However, when the number of molar equivalents of alkylene oxide added exceeds 250, the effects of blockade of caprolactam and phosphoric esterification are substantially lost and problems of dispersion stability and coloration in the melt polyamide are encountered. It is preferred therefore to limit the alkylene oxide to less than 250 molar equivalents.

In the practice of the present invention, a phosphoric esterified alkylene oxide addition product of a monomer containing in its molecule a carbonamide group or a polyamide oligomer is used. The phosphoric acid compound reacted with the terminal group of such an alkylene oxide addition polymer to produce this compound may be, for example, phosphorus oxychloride or phosphoric anhydride. The phosphoric esterification by such a phosphoric acid compound brings about a monoester, a diester and a triester depending upon the phosphoric esterification agent or the reaction conditions. The former two, viz a monoester and a diester, bring about remarkable elevation of the viscosity of a polyamide when they are added to a polyamide to melt shape the polyamide composition. As a result of detailed examination of this phenomenon, it has been determined that as the triester content is increased this viscosity elevation is inhibited.

This elevation may be partially prevented by mere neutralization with an alkali. However, since neutralization with an alkali merely substitutes a metal ion or other cation for active hydrogen of the phosphoric ester the effect thereof is easily isolated and it is therefore not necessarily effective in all cases.

In order to accomplish the phosphoric triesterification of a high molecular weight alkylene oxide addition polymer, it is necessary to use a strong phosphoric esterification agent, such as, phosphorus oxychloride. (However, the present invention is not limited thereto.) In the polymer thus obtained, although varying depending upon the molecular weight of the alkylene oxide addition polymer, more than 50–70% of the phosphoric ester is obtained as a triester. In the practice of the present invention, however, a monoester and/or diester or metal derivatives thereof may be contained insofar as their amount is within the range substantially not interfering with the effect of the antistatic compound used in the present invention.

Of compounds useful in the present invention, those especially preferred are phosphorus esterified addition products of (a) a compound containing a carbonamide group selected from the class consisting of (i) a 4–13-member lactam, (ii) an oligomer of a 4–13-member lactam, (iii) a low molecular weight polycondensation product, up to a hexamer of ω-aminocarboxylic acid and (iv) a low molecular weight polycondensation product, up to a trimer of a dicarboxylic acid and a diamine, to (b) an alkylene oxide having 2–3 carbon atoms, having a structural unit of the following general formula

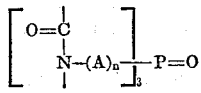

wherein $(A)_n$ stands for a polymer selected from the group consisting of a homopolymer of ethylene oxide, a block copolymer of ethylene oxide and propylene oxide and a random copolymer of ethylene oxide and propylene oxide; and $n$ is an integer of from 10 to 250.

This phosphoric triester, of an addition product of alkylene oxide addition polymer with a monomer containing in its molecule a carbonamide group or a polyamide oligmer, used in the present invention, which is hereinafter referred to merely sometimes as an antistatic agent, has certain properties described in more detail below.

For example, a product obtained by phosphoric esterification with phosphorus oxychloride of an ethylene oxide addition product (50 moles ethylene oxide per mole carbonamide) of ε-caprolactam is a white waxy solid containing about 70% of triester and having a melting point of 55° C. A product obtained by phosphoric esterification with phosphorus oxychloride of an ethylene oxide addition product (50 moles ethylene oxide per mole carbonamide) of a nylon 6 oligomer (predominantly a dimer) obtained from an extract by washing with water of nylon 6 similarly contains about 70% of triester and has a melting point of 57° C.

Generally, a phosphoric ester of a compound wherein the molar proportion of alkylene oxide to carbonamide is small is a liquid or a paste at room temperature.

The foregoing antistatic agent (phosphoric triester) having a carbonamide group is incorporated into the synthetic linear polyamide in an amount of 0.5–15% by weight, preferably 0.5–7% by weight based on the polyamide. When the blending ratio of the antistatic agent exceeds 15% by weight based on the polyamide, it separates from the polyamide during melt spinning and yarn breakage occurs. Generally the yarn making property in such a case is poor and such a high blending ratio is therefore undesirable. On the other hand, when this ratio is less than 0.5% by weight, the antistatic effect, which is an object of the present invention, is not realized.

If the esterification reaction mixture (mixture of triester, diester, monoester and unreacted reactants) is used, rather than the triester isolated therefrom, as the antistatic agent, the total amount of such mixture used should preferably also not exceed 15% by weight based on the polyamide even though the blending amount of triester used may actually be substantially below 15% in this case.

The polyamide used in the practice of the present invention is a synthetic linear polyamide. As a synthetic linear polyamide, there are, for example, nylon 6 (poly-ω-caprolactam), nylon 66 (polyhexamethylene adipamide), nylon 7 (poly-ω-aminoheptanoic acid), nylon 8 (polycapryllactam), nylon 610 (polyhexamethylene sebacamide), nylon 11 (poly-ω-aminoundecaneamide) and nylon 12 (polylaurolactam). Polyamides having an aromatic ring such as polyamide obtained from p-xylylenediamine and dodecandioic acid and other polyamides having in their main chain an ether bond or an alicyclic or hetero ring, and copolymers of at least two of these polyamides are usable as well.

In the present invention, it is necesary that the antistatic agent be mixed as uniformly as possible in these synthetic linear polyamides. Thus, in the present invention the antistatic agent is mixed in the polyamide before the latter is molded. For example, the super polyamide chips and the antistatic agent are first blended in an extruder; then the antisatic agent is dispersed uniformly by melting the mixture, and thereafter the mixture is extruded and made into filaments. Also useable is a master batch technique which is carried out in the following manner. A master batch is prepared which contains the antistatic agent in a high concentration. Next, this is mixed with polyamide chips to which the antistatic agent has not been added to accomplish the dilution of the mixture to the desired concentration thereby obtaining a mixture, hence products, in which the antistatic agent is well dispersed. Alternatively, the polyamide chips can be treated with the antistatic agent dissolved in a solvent, to effect the uniform blending of the antistatic agent with the polyamide chips, followed by removal of the solvent and spinning of the chips in customary manner. Again, the antistatic agent can be added to the monomer during the polymerization reaction, if necessary. Further, when the antistatic agent is added during the polymerization reaction, a more uniform dispersion can be obtained than in the case wherein the antistatic agent is mixed with the chips. Moreover, it can be said to be more economical since an extra step is eliminated.

In the polyamide composition of the present invention other additives such as ultraviolet ray absorbents, heat resistant agents, delustrants, dyes, pigments and similar compounds may be used concurrently with the antistatic agent of the present invention.

The polyamide composition containing the antistatic agent, as taught herein, can be readily formed into fiber, film, sheet, rod tube, casting and other shaped articles by means that are generally known. An especially satisfactory antistatic effect is manifested when the polyamide composition of the present invention is formed into fibers.

The modified polyamide of the present invention, in the form of textiles, can be made into or used as, for example, staple, flock, cord, tow, woven fabric or the like. Further, they can either be used alone or as a blend with other fibers and they can readily be blended and dyed.

The electric resistance of a polyamide fiber in which is incorporated the antistatic agent of the present invention is remarkably lowered and its charging with electricity at a low humidity may be avoided semipermanently. Therefore, various problems due to generation of static electricity in the manufacturing step of fiber products are eliminated and unpleasant experiences such as shock due to electric discharge, occurrence of spark and clinging to the wearer's body, while the final product of clothing or carpets are being used, disappear. In addition, the antistatic agent according to the present invention has substantially no adverse effect on the inherent desirable properties of a polyamide, viz, good dyeability, tenacity, abrasion resistance, high temperature resistance during manufacturing and processing, and freedom from discoloration tendencies. Moreover, the antistatic capacity imparted by said antistatic agent is not substantially diminished with time or by laundering.

Again, because phosphoric triester, as contrasted with a di- or mono-ester, is the primary antistatic agent in the present invention, the melt viscosity of the polyamide at the time of shaping, such as spinning, is not elevated. Accordingly, problems which might otherwise be encountered at the time of shaping do not occur.

In summary, the antistatic agent comprising a phosphoric triester of an addition product of a low molecular weight compound containing a carbonamide group and an alkylene oxide does not adversely affect the manufacturing operations of shaped articles when it is incorporated into the polyamide, as mentioned above, and furthermore it imparts durable antistatic properties to the polyamide.

The following examples are given for the further illustration of the present invention. Unless otherwise specified, the parts and percentages in the following examples are on a weight basis. As methods of measuring values of the electric properties in the following examples, the following three methods are adopted.

(A) Electric resistance: At both ends of a washed fiber bundle, a voltage of 100 volts is impressed and the leaking resistance at that time is measured.

(B) Frictionally charged votage: Using a commercially available rotary static tester (manufactured by Koa Shokai Co., Ltd. of Japan), a frictionally charged voltage brought about when a sample fiber bundle or knitted or woven fabric is rubbed to a polyester film (biaxially drawn, 50 microns thick) is measured. The measuring atmosphere is 25° C. and 65% relative humidity (RH).

Note: A rotary static tester is an instrument in which a sample is adhered to the side surface of a cylinder, which is rotated, whereby said sample is rubbed to the objective friction sample and an electrostatic voltage brought about as a result is measured. An electrostatic voltage exceeding 3000 volts brought about by this method indicates a very high degree of static electricity.

(C Voltage charge on a human body: (This test is used mainly for carpets.) In a room in which the temperature and humidity are controlled to 25° C. and 40% RH, a tester wearing a pair of shoes the soles of which are made of cattle skin runs for 10 minutes over a sample of carpet to be tested and the voltage with which the wearer's body is charged as a result is measured by a collector type potentiometer (manufactured by Kasuga Electric Co., Ltd. of Japan).

Note: A collector type potentiometer ionizes air, by α particles emitted from radium, in a space between a lead from the instrument and the object the electric potential of which is to be measured; this electric potential is then determined from the electroconductive circuit brought about as a result.

EXAMPLES 1–5

To 100 parts of ε-caprolactam, 1200 parts of ethylene oxide was addition polymerized in the presence of 0.1 part of a potassium hydroxide catalyst at a reaction temperature of about 160° C. under a reaction pressure of 4.5 kg./cm.$^2$ for a reaction period of about 4 hours. From the analysis of the terminal hydroxyl group of the addition polymer thus obtained, it was found that about 25 moles of ethylene oxide per a mole of ε-caprolactam were present in the product. This addition polymer was a light yellow wax.

Next, 1213 parts of this addition polymer was melted at 60° C. and 50 parts of phosphorus oxychloride were added dropwise to it. This mixture was then reacted with sufficient stirring for 6 hours to be phosphoric esterified. Hydrochloric acid produced as by-product at the time of the phosphoric esterification reaction was neutralized by sodium hydroxide. When the elemental analysis of this esterified product and the analysis of the terminal hydroxyl group thereon were carried out, it was found that more than 70% by weight had been triesterified and what remained was the unreacted and sodium salt of a diester.

The antistatic agent thus obtained was a mixture containing 70% of phosphoric triester, being a light yellow wax. The pH of a 1% aqueous solution thereof was 7.2.

Next, with 100 parts of ε-caprolactam, various amounts of said antistatic agent were blended; further, 0.1 part of acetic acid and 20 parts of water were added to the resultant mixtures. These mixtures were then polymerized at 260° C. for 20 hours and thereafter spun from a spinneret to obtain pellets. The pellets were washed with boiling water for 6 hours twice to remove monomer and low polymers.

The contents of the antistatic agent in the polyamide products, based on polymer weight, were as shown in Table 1.

Each of these compositions was melt spun at a temperature of 270° C. and the undrawn filaments were drawn 3.8 times to obtain a 40 denier/10 filaments multifilamentary yarn.

After each sample was washed with boiling water for 30 minutes, the electric resistance thereof was measured. A knitted fabric made by using a cylindrical knitting machine of such sample was similarly washed with boiling water for 30 minutes and the frictionally charged voltage of each sample fabric was measured. The results were as shown in Table 1. As Comparative Examples Table 1 also lists corresponding test results and properties for an unmodified polyamide fiber (i.e. one not containing an antistatic agent) and polyamide containing 0.3% and 25% of the antistatic agent, respectively.

Modified polyamide yarns blended with 0.5–15% by weight of the antistatic agent were free from yarn breaking during melt spinning and were capable of being made into yarns with good antistatic properties. In contrast thereto, the yarn blended with less than 0.5% of the antistatic agent exceeded 3000 volts in frictionally charged voltage, being insufficient in antistatic properties and the yarn blended with more than 15% of the antistatic agent could not be made into a yarn on account of yarn breaking.

TABLE 1

| Example | Antistatic agent (weight percent) | $H_2SO_4$ relative viscosity | Electric resistance (Ω. cm.) | Frictionally charged voltage (v.) | Yarn breakage per hour during spinning |
|---|---|---|---|---|---|
| 1 | 0.5 | 2.6 | 20×10$^6$ | 2,000 | 0 |
| 2 | 3 | 2.5 | 6.1×10$^6$ | 1,500 | 0 |
| 3 | 5 | 2.5 | 3.8×10$^6$ | 1,100 | 0 |
| 4 | 10 | 2.4 | 2.1×10$^6$ | 900 | 0.1 |
| 5 | 15 | 2.3 | 1.0×10$^6$ | 700 | 0.2 |
| Comparative Example: | | | | | |
| 1 | 0 | 2.6 | 3,300×10$^6$ | 4,200 | 0 |
| 2 | 0.3 | 2.7 | 100×10$^6$ | 3,300 | 0 |
| 3 | 25 | 2.0 | ---- | ---- | (¹) |

¹ Could not be made in to a yarn.

Using the sample yarns of Examples 1–5, tricot was knitted by an ordinary method. This tricot was scoured, fluorescent bleached and set, and thereafter sewn into slips. When these slips were worn in winter for testing, the slips made from polyamide which included the antistatic agent of the present invention were free from electical discharge upon dressing and undressing and unpleasant phenomenon such as turning up of the skirts.

EXAMPLES 6–9

Addition polymers obtained by reacting ε-caprolactam with various amounts of ethylene oxide were phosphoric esterified by a method similar to that in Examples 1–5 to obtain various antistatic agents, differing in the proportion of ethylene oxide to carbonamide, as shown in Table 2. However, the amounts of the phosphoric esterification agent used were controlled by the number of moles of such agent added in each example. Each of these antistatic agents was blended in an amount of 5% with ε-caprolactam and these blends were polymerized and made into yarns by a method similar to that in Examples 1–5 to obtain modified polyamide yarns. The characteristics of these yarns when tested by the same methods used in Examples 1–5, were as shown in Table 2. For purposes of comparison Comparative Examples 4 and 5, wherein the mole ratio of ethylene oxide to carbonamide were 5 and 300 respectively, are also included in Table 2.

TABLE 2

| Example | Mole ratio ethylene oxide to carbonamide | Yarn breakage per hour during spinning | Coloration of the polymer | Electric resistance (Ω. cm.) | Frictionally charged voltage (v.) |
|---|---|---|---|---|---|
| 6 | 10 | 0.1 | Good | $8.6 \times 10^6$ | 1,500 |
| 7 | 50 | 0 | ...do... | $4.2 \times 10^6$ | 1,000 |
| 8 | 100 | 0 | ...do... | $5.0 \times 10^6$ | 1,000 |
| 9 | 250 | 0 | ...do... | $4.5 \times 10^6$ | 900 |
| Comparative Example: | | | | | |
| 4 | 5 | 1.0 | ...do... | $110 \times 10^6$ | 3,200 |
| 5 | 300 | 0 | Bad | $5.2 \times 10^3$ | 1,100 |

EXAMPLE 10

To 113 parts of ε-caprolactam, 1100 parts of ethylene oxide was addition polymerized in the presence of sodium hydroxide at a reaction temperature of about 170° C. under a reaction pressure of 4.5 kg./cm.$^2$ for a reaction period of about 4 hours. The resultant addition polymer had an average of 20 moles of ethylene oxide per mole of ε-caprolactam and was a light yellow paste. Next, to 1000 parts of this addition polymer, melted at 60° C., 50 parts of phosphorus oxychloride was gradually added dropwise and the mixture was stirred for 8 hours to complete the phosphoric esterification. To the esterified product, calcium hydroxide was added to neutralize hydrochloric acid and phosphoric acid produced as by-products.

As a result of elemental analysis and analysis of the terminal hydroxyl group of the reaction product, it was determined that more than 70% of the product, by weight, was triesterified and the rest was unreacted reactants and a phosphoric diester calcium salt. The antistatic agent (mixture) was light yellowish white and the pH of a 1% aqueous solution thereof was 7.3.

Separately, 1000 parts of the addition polymer was heated and melted at 70° C. To this 140 parts of phosphoric anhydride ($P_2O_5$) was added little by little and the mixture was reacted with vigorous stirring for 4 hours. To the reaction product, phosphoric anhydride and an approximately equivalent amount of calcium acetate were added to neutralize the unreacted phosphoric anhydride and, at the same time, to make calcium salts of the phosphoric and monoesters.

The reaction product thus obtained was a light yellowish white paste and the pH of a 1% aqueous solution thereof was 6.8. By elemental analysis and analysis of the terminal hydroxyl group, it was found that more than 70% of this product was a diester and the rest was unreacted reactants and a monoester.

Further, an esterified product similar to those described above, wherein the diester-monoester mixture had not been neutralized by calcium acetate, was synthesized. This product also was a light yellow paste and the pH of a 1% aqueous solution thereof was 3.5.

Next, with 100 parts of ε-caprolactam, 6 parts of each of the foregoing antistatic agents consisting, respectively, of a phosphoric triester (A), predominantly of a metal salt of a phosphoric diester (B) and predominantly of a phosphoric diester (C). Each of these mixtures was then processed into 40 denier/10 filament modified polyamide yarns. The filtering pressure at the time of spinning 5 hours after the initiation of the spinning and yarn breakage frequency during drawing were as shown in Table 3. Further, the antistatic properties of these modified polyamide yarn and similar unmodified polyamide yarns, wherein the polyamide included no antistatic agent blended at the time of washing with boiling water for 30 minutes, were measured under conditions such as those described in Examples 1–5 and the results were as shown in Table 3.

The conventional antistatic agent, consisting predominantly of a phosphoric diester (C) greatly increased the viscosity of the polyamide when it was melted again and rendered the polyamide substantially non-spinnable. The antistatic agent wherein said phosphoric diester was neutralized by calcium acetate to convert it to a calcium salt (B) did not increase polyamide melt viscosity as greatly as did (A) and the polyamide including antistatic agent B was tentatively spinnable. However, elevation of the filtering pressure during spinning was very high and this rendered the polyamide very poor in drawability. On the other hand, the polyamide including the antistatic agent consisting predominantly of a phosphoric triester according to the present invention (A) was no different than an unmodified polyamide with respect to melt viscosity and filtering pressure during spinning. Moreover this modified polyamide was excellent in drawability and antistatic properties.

TABLE 3

| Example | Antistatic agent | Melt viscosity (poise) at 260° C. Immediately after melting | Melt viscosity (poise) at 260° C. 60 minutes after melting | Filtering pressure during spinning (kg./cm.$^2$) | Yarn breakage per hour during drawing | Electric resistance (Ω.cm.) | Frictionally charged voltage (v.) |
|---|---|---|---|---|---|---|---|
| 10 | A | 2,000 | 3,000 | 90 | 0.5 | $7.0 \times 10^6$ | 1,000 |
| Comparative Example: | | | | | | | |
| 6 | B | 2,100 | 7,000 | 200 | 20 | $8.5 \times 10^6$ | 1,200 |
| 7 | C | 2,250 | 18,000 | $^1$ >300 | | | |
| 8 | | 1,900 | 2,800 | 80 | 0.3 | $2,000 \times 10^6$ | 4,100 |

$^1$ Non-spinnable.

EXAMPLE 11

To 127 parts of enanthlactam, 1100 parts of ethylene oxide was addition polymerized in the presence of 0.1 part of a potassium hydroxide catalyst at a reaction temperature of 170° C. under a reaction pressure of 4.3 kg./cm.$^2$ for a reaction period of about 5 hours. From analysis of the terminal hydroxyl group, it was found that the resultant addition polymer had an average of 23 moles of ethylene oxide per mole of enanthlactam. This polymer was a light yellow paste.

Next, 1139 parts of this addition polymer was melted at 65° C., and to it 50 parts of phosphorus oxychloride was added dropwise; the mixture was then reacted for 6 hours with sufficient stirring to effect phosphoric esterification. Thereafter, hydrochloric acid and phosphoric acid produced as by-products were neutralized with calcium hydroxide. By elemental analysis and analysis of the terminal hydroxyl group of the resultant product, it was found that more than 65% of the product was phosphoric triesterified and the rest was unreacted reactant and a calcium salt of a diester. The antistatic agent thus obtained was a light yellow paste and the pH of a 1% aqueous solution thereof was 7.1.

Next, 4 parts of this antistatic agent was blended with 100 parts of ε-caprolactam under conditions and by a method such as those described in Examples 1–5. This blend was polymerized, spun and pelletized. Further, by method and conditions such as those described in Examples 1–5, the pellets were melt spun to obtain a 40 denier/10 filaments filamentary yarn.

After this sample was cleaned by a method such as that used in Examples 1–5, the antistatic properties thereof were measured. As a result, it was found that the electric resistance was $5.6 \times 10^6 \Omega$. cm. and the frictionally charged voltage was 1200 volts. Thus the sample demonstrated antistatic properties, similar to those observed with ε-caprolactam-ethylene oxide addition product (20 moles) phosphoric triester mentioned in Examples 1–5.

EXAMPLE 12

To 113 parts of ε-caprolactam, 1800 parts of 1:1 mixture of ethylene oxide and propylene oxide was added and the resultant mixture was addition polymerized in the presence of 0.08 part of potassium hydroxide at a reaction temperature of 170° C. under a reaction pressure of 4.0 kg./cm.$^2$ for a reaction period of about 6 hours. The addition polymer thus obtained was a random copolymer with an average of 30 moles of ethylene oxide and propylene oxide per mole of ε-caprolactam.

Next, 1700 parts of this addition polymer was melted at 70° C. To this, 50 parts of phosphorus oxychloride was added dropwise and the mixture was stirred and reacted for 5 hours. Hydrochloric acid and phosphoric acid produced as byproducts at the time of this phosphoric esterification were neutralized by barium hydroxide. By elemental analysis and analysis of the terminal hydroxyl group, it was found that in the esterified product more than 68% of the product was triesterified and the rest was unreacted reactant and a barium salt of a diester. This product was a light yellow wax and the pH of a 1% aqueous solution thereof was 7.2.

Next, 3 parts of this antistatic agent was added to 100 parts of pellets of polyhexamethylene adipamide (relative viscosity at 25° C. in sulfuric acid 2.58). The mixture was well stirred and blended at room temperature and thereafter it was supplied to an extruder type spinning machine, melted and kneaded at 285° C., thereafter spun and continuously drawn 3.8 times to obtain a 70 denier/17 filaments modified polyamide yarn.

Similarly, polyhexamethylene adipamide not blended with an antistatic agent was spun and drawn to obtain a similar unmodified polyamide yarn (Comparative Example 9).

After washing these yarns with boiling water and measuring their antistatic properties under conditions such as those described in Examples 1–5, the unmodified polyamide yarn, not blended with an antistatic agent (Comparative Example 9) was found to have an electric resistance of $2900 \times 10^6 \Omega$. cm. and a frictionally charged voltage of 5600 volts. In contrast the modified polyamide yarn of the present invention (Example 12) had an electric resistance of $9 \times 10^6 \Omega$. cm. and a frictionally charged voltage of 1300 volts, thus demonstrating good antistatic properties.

With regard to processability into yarn, the modified polyamide of the present invention was excellent and was not different from the unmodified polyamide in this respect.

EXAMPLE 13

The aqueous solution of the extract obtained by washing and extracting with water at 98° C. for 6 hours a polycapramide obtained by mixing 100 parts of ε-caprolactam, 20 parts of water and 0.15 part of acetic acid and polymerizing the mixture at 260° C. for 20 hours was collected and concentrated. The obtained concentrated aqueous solution was distilled under atmospheric pressure to remove the water and the ε-caprolactam. The residue was then dissolved in hot water and recrystallization thereof was repeated to obtain a mixture of oligomers of the polycapramide (mainly consisting of a cyclic dimer, a cyclic trimer and a cyclic tetramer).

In 1200 cc. of benzene, 113 parts of this polycapramide oligomer was dispersed and reacted with 1600 parts of ethylene oxide in the presence of 0.12 part of sodium hydroxide within an autoclave. The ratio of moles of ethylene oxide to moles of carbonamide in this addition polymer was 30 moles per mole of amide group.

In toluene in an amount 5 times that of the addition polymer, 1500 parts of this addition polymer was dispersed and dissolved. To this solution, 50 parts of phosphorus oxychloride was added dropwise and the mixture was reacted at 70° C. for 5 hours to effect phosphoric esterification. Hydrogen chloride produced as a by-product was neutralized by barium hydroxide. When this phosphoric ester was analyzed, it was found that more than 75% of it was a triester and the rest was unreacted reactant and a phosphoric diester. This reaction product, referred to hereinafter as antistatic agent (D), was a light yellow wax (melting point: 50° C.).

Separately, to a low molecular weight polycapramide having a degree of polymerization of 30, 30 moles of ethylene oxide per a mole of amide group was added and polymerized. Then the addition polymer was dispersed in toluene to similarly effect phosphoric esterification to synthesize another antistatic agent (E).

To 100 parts of ε-caprolactam, 5 parts of each of the foregoing phosphoric triesters was added. The mixture was polymerized, spun and drawn by methods such as those described in Examples 1–5 to obtain a 40 denier/10 filaments yarn. No elevation of the melt viscosity of the modified polycapramide during spinning was observed and there was no yarn breakage during drawing. Further the yarn was produced in good condition.

The characteristic properties of this yarn are shown in Table 4, wherein as Comparative Examples properties of yarns produced from polyamides without antistatic agent are also listed.

When antistatic agent (E) was incorporated in a polycapramide made from a low molecular weight polycapramide having many amide units and this polycapramide was spun, no problems were encountered during spinning initially. However, after a while gelation of the modifier due to heat took place and the gel accumulated on the heating unit to greatly lower its melting capacity. Finally spinning became impossible. On the other hand, a polycapramide blended with the antistatic agent of the present invention (D) was entirely free from such troubles and could be made into a yarn in good condition.

TABLE 4

| Examples | Antistatic agent | Spinning condition | Electric resistance (Ω. cm.) | Frictionally charged voltage (v.) |
|---|---|---|---|---|
| 13 | D | Good | $6.52 \times 10^6$ | 730 |
| Comparative Example: | | | | |
| 9 | E | Bad | | |
| 10 | None | Good | $10.68 \times 10^6$ | 4,100 |

EXAMPLES 14–17

To four samples, consisting of 100 parts each of polyhexamethylene adipamide, 1, 3, 5 and 7 parts of the antistatic agent used in Examples 1–5 (phosphoric triester of the addition polymer of ε-caprolactam and ethylene oxide) were added respectively. Each of the mixtures was well mixed and melt-knead spun using a screw type extruder to prepare master pellets that were drawn 4.2 times by an ordinary method to obtain 70 denier/24 filament yarns.

There were no problems, such as yarn breaking during spinning due to separation of said antistatic agent within the spinning machine, and elevation of pressure inside the spinning machine due to elevation of the melt viscosity of the polycapramide. From each of these mixtures yarns were made in good condition.

An unmodified polyhexamethylene adipamide was similarly spun and drawn into a 70 denier/24 filament yarn.

The results of measuring the antistatic properties of each of the sample yarns after they were washed with boiling water for 30 minutes by the method described in Examples 1–5 were as shown in Table 5.

TABLE 5

| Example | Amount of antistatic agent (parts) | Electric resistance (Ω.cm.) | Frictionally charged voltage (v.) |
|---|---|---|---|
| 14 | 1 | 8.2×10⁶ | 1,050 |
| 15 | 3 | 7.1×10⁶ | 810 |
| 16 | 5 | 4.2×10⁶ | 520 |
| 17 | 7 | 2.0×10⁶ | 450 |
| Comparative Example 11 | None (unmodified). | 3,000 | 4,200 |

EXAMPLE 19

With three samples consisting of 100 parts each of ε-caprolactam, 5 parts each of the antistatic agent obtained in Example 7 (phosphoric triester of the addition polymer of ε-caprolactam and ethylene oxide), a commercially available polyethylene glycol (molecular weight: 4500) and a nonylphenolethylene oxide adduct (molecular weight: 2200) were blended respectively with one of the ε-caprolactam samples. Each of the mixtures were polymerized by the method and under the conditions described in Examples 1–5 to obtain a modified polyamide.

These yarns were washed with boiling water by the method described in Examples 1–5 and the results of measuring their antistatic properties were as shown in Table 7.

The polyamide yarns blended with a conventional antistatic agent (Comparative Examples 13 and 14) had poor spinnability and broke frequently during spinning. Moreover, the antistatic properties of such yarns after they were cleaned were generally insufficient. In contrast thereto, the modified polyamide yarn blended with the antistatic agent of the present invention had excellent spinnability and antistatic properties.

TABLE 7

| Example | Antistatic agent | Yarn breakages per hour during spinning | Electric resistance (Ω.cm.) | Frictionally charged voltage (v.) |
|---|---|---|---|---|
| 19 | The antistatic agent of the present invention. | 0.1 | 6.6×10⁶ | 850 |
| Comparative Example: | | | | |
| 13 | Polyethylene glycol | 3.2 | 82×10⁶ | 2,700 |
| 14 | Nonylphenol-ethylene oxide adduct. | 5.2 | 9×10⁶ | 1,150 |
| 15 | None | 0 | 2,900×10⁶ | 4,900 |

EXAMPLE 18

To 100 parts of polycapramide, 3 parts of the antistatic agent used in Examples 1–5 (phosphoric triester of the addition polymer of a ε-caprolactam and ethylene oxide) was added. The mixture was melt kneaded by the method used in Examples 14–17 to prepare master pellets. These master pellets were melt spun at 280° C. by an ordinary method, drawn 4.5 times by wet heating and thereafter crimped and cut to prepare staple fibers. The staple fiber thus produced had a single filament denier of 15, a cut length of 150 mm. and 13 crimps per 25 mm.

By a similar method, an unmodified polycapramide not blended with the antistatic agent was made into a staple fiber. These samples were scoured and dyed in a customary manner and thereafter spun to knit staple carpets. After the humidity of these carpets was controlled by placing them in a room at 25° C. and 40% RH for 24 hours, a tester wearing a pair of shoes having leather soles ran on each of the carpets for 10 minutes and the voltage charge on the wearer's body was measured after each such test. The results were as shown in Table 6.

TABLE 6

| Example | Voltage charged on wearer's body (v.) | Discharged [1] |
|---|---|---|
| 18 | 1,500 | None. |
| Comparative Example 12 | 5,200 | Vigorous. |

[1] Shock when the wearer touched a metal bar.

What is claimed is:

1. A synthetic linear polycarbonamide composition having improved antistatic properties consisting essentially of a fiber forming polycarbonamide including an antistatic agent in an amount of 0.5–15%, by weight, based on the weight of said polycarbonamide, said antistatic agent comprising a phosphoric triester of an addition product of (a) a compound containing a carbonamide group selected from the class consisting of (i) a 4–13-member lactam, (ii) an oligomer of a 4–13-member lactam, (iii) low molecular weight polycondensation product having less than seven monomeric units of an ω-aminocarboxylic acid having 3–12 carbon atoms and (iv) a low molecular weight polycondensation product having less than four monomeric units of a dicarboxylic acid and a diamine, and (b) an alkylene oxide, wherein said ester has the following general structural formula

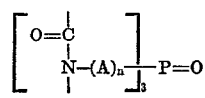

wherein

represents said compound containing a carbonamide group and $(A)_n$ is a polymer selected from the group consisting of a homopolymer of ethylene oxide, a homopolymer of propylene oxide, a block copolymer of ethylene oxide and propylene oxide and a random copolymer of ethylene oxide and propylene oxide, and $n$ is an integer of from 10 to 250.

2. The synthetic linear polycarbonamide composition according to claim 1 wherein said compound containing a carbonamide group is $\epsilon$-caprolactam.

3. The synthetic linear polycarbonamide composition according to claim 1 wherein said compound containing a carbonamide group is an oligomer having from 2 to 6 monomer groups of a 4–13-member lactam.

4. The synthetic linear polycarbonamide composition according to claim 1 wherein said compound containing a carbonamide group is a low molecular weight condensation polymer having less than seven monomeric units of an $\omega$-aminocarboxylic acid having 3–12 carbon atoms.

5. The synthetic linear polycarbonamide composition according to claim 1 wherein said compound containing a carbonamide group is a low molecular weight condensation polymer having less than four monomeric units of a dicarboxylic acid and a diamine.

6. The synthetic linear polycarbonamide composition according to claim 5 wherein said dicarboxylic acid is adipic acid and said diamine is hexamethylene diamine.

7. The synthetic linear polycarbonamide composition according to claim 1 wherein said synthetic linear polyamide is a polymer selected from the group consisting of poly-$\epsilon$-capramide and the condensation polymer of hexamethylene diamine and adipic acid.

8. A molecularly oriented fiber composed of the polycarbonamide composition defined in claim 1.

References Cited
UNITED STATES PATENTS

| | | | |
|---|---|---|---|
| 3,560,449 | 2/1971 | Kitagawa et al. | 26—78 R |
| 3,557,060 | 1/1971 | Kitagawa et al. | 26—78 R |

HAROLD D. ANDERSON, Primary Examiner

U.S. Cl. X.R.

57—140 R; 260—78 R, 78 A, 78 L; Dig. 16, 19